United States Patent [19]

Maruyama

[11] Patent Number: 4,743,101
[45] Date of Patent: May 10, 1988

[54] REAR-ATTACHMENT LENS SYSTEM

[75] Inventor: Koichi Maruyama, Tokyo, Japan

[73] Assignee: Asahi Kogaku Kogyo Kabushiki Kaisha, Tokyo, Japan

[21] Appl. No.: 33,705

[22] Filed: Apr. 3, 1987

[30] Foreign Application Priority Data

Apr. 4, 1986 [JP] Japan .................................. 61-78999

[51] Int. Cl.$^4$ ........................ G02B 15/10; G02B 9/14
[52] U.S. Cl. ................................................. 350/422
[58] Field of Search ............... 350/422, 432, 476, 480

[56] References Cited
U.S. PATENT DOCUMENTS 4,591,234  5/1986  Hamanishi ........................... 350/422

Primary Examiner—John K. Corbin
Assistant Examiner—Rebecca D. Gass
Attorney, Agent, or Firm—Sughrue, Mion, Zinn, Macpeak & Seas

[57] ABSTRACT

A rear attachment lens mounted between a master lens and an image plane for increasing the composite focal length. It consists of four lenses. The first lens is negative and has a concave surface on the image side. The second lens is positive, convex on both sides and cemented to the first lens. The third lens is negative and is concave towards the master lens. The fourth lens is positive, convex towards the master lens and has at least one aspherical surface. Preferably five numerical conditions on magnification, refractive indices, radius of curvature and asphericity are satisfied.

10 Claims, 3 Drawing Sheets

REAR-ATTACHMENT LENS SYSTEM

BACKGROUND OF THE INVENTION

1. Field of the Invention

The present invention relates to a rear-attachment lens system which is mounted between a photographic lens (hereinafter referred to as a master lens) and the body of a camera for the purpose of providing an increased composite focal length. More particularly, the present invention relates to a rear-attachment lens system of the three-unit-four-element type that employs an aspherical lens element at the position which is closest to the image plane.

2. Background of the Invention

Recent advances in lens design technology have been remarkable and appreciable improvements have been achieved in the performance of rear-attachment lenses which are intended to be mounted between the master lens and the body of a camera for the purpose of providing an increased composite focal length. A master lens is a typical camera lens that functions well by itself. The rear-attachment lens is inserted between the master lens and the camera body, thereby displacing the master lens away from the camera body, in order to change the composite focal length.

In the past, the design concept of rear-attachment lenses was based on the idea of using one rear-attachment lens for a limited scope of master lenses. However, commercial products available today have been developed in order to meet the requirement for using a single rear-attachment lens in association with a group of master lenses having a fairly wide range of focal lengths and F numbers.

Wide-angle and standard lenses greatly differ from telephoto and super-telephoto lenses with respect to the position and diameter of the exit pupil. Some of the rear-attachment lenses available today perform satisfactorily when they are used with wide-angle or normal master lenses which have an exit pupil at a position close to the image plane but if they are used with telephoto lenses, they experience astigmatism or a reduction in marginal illumination. Rear-attachment lenses suitable for use with telephoto master lenses have also been manufactured but since they are primarily designed to be combined with master lens of long focal lengths, they cannot be attached to wide-angle, normal or semi-telephoto lenses. In addition, these rear-attachment lenses are intended to be used with master lenses having fairly large F numbers and cannot be satisfactorily used with bright master lenses unless their aperture is stopped down to prevent the occurrence of large spherical aberrations.

SUMMARY OF THE INVENTIONS

An object, therefore, of the present invention is to provide a rear-attachment lens system that guarantees a virtually uniform and high performance irrespective of the position of the exit pupil in the master lens with which the rear-attachment lens system is to be used.

The invention can be summarized as a rear attachment lens mounted between a master lens and an image plane for increasing the composite focal length. It consists of four lenses. The first lens is negative and has a concave surface on the image side. The second lens is positive, convex on both sides and cemented to the first lens. The third lens is negative and is concave towards the master lens. The fourth lens is positive, convex towards the master lens and has at least one aspherical surface. Preferably five numerical conditions on magnification, refractive indices, radius of curvature and asphericity are satisfied.

DETAILED DESCRIPTION OF PREFERRED EMBODIMENTS

Figure 1:
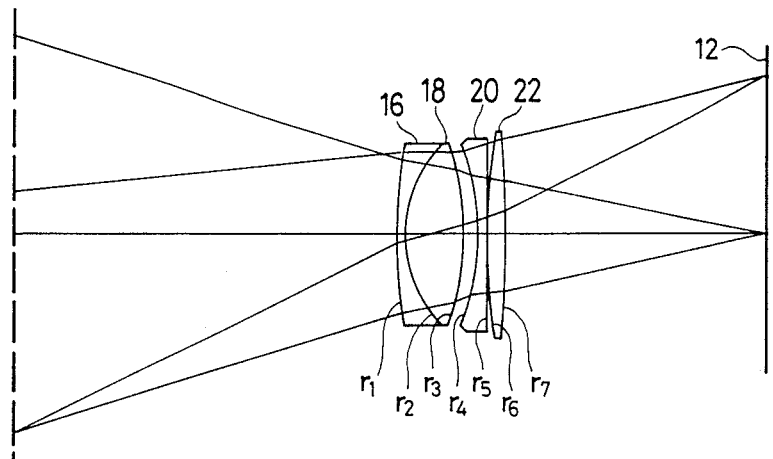
FIG. 1 is a simplified cross-section view of the lens system according to Example 1 of the present invention.

Four embodiments of the invention are shown in FIGS. 1, 3, 5 and 7 with sample rays being shown in FIG. 1.

The rear-attachment lens is attached to the image side of the master lens with which it is used for the purpose of producing an enlarged view. To this end, the rear-attachment lens system is composed of negative lens elements which, as whole, provide a strong negative power. This requirement for a strong negative power is particularly important for the purposes of the present invention because the rear-attachment lens system to which it relates is to be disposed at a position near an image plane 12 in order to render it compatible not only to a telephoto lens but also to a wide-angle lens having a short back focus.

According to the general design concept of rear-attachment lens systems, the positive lens elements are made of a low refractive-index glass and the negative lens elements of a high-refractive-index glass so that the resulting Petzval sum is small but will not take on a negative value. Even if this precaution is taken, the use of lens surfaces with a small radius of curvature is unavoidable and great aberrational variations will occur depending upon the angle at which rays of light encounter the lens surfaces. If axial spherical aberrations are effectively compensated, the astigmatism remains uncorrected. On the other hand, if the astigmatism is corrected, the spherical aberration that develops in a bright master lens cannot be compensated.

According to the rear-attachment lens system of the present invention, an aspherical lens is positioned on the side of the lens system which is closest to the image plane 12. The aspherical side of this lens can face either direction. This aspherical lens is effective for the purpose of displacing the meridional image plane to achieve compensation for astigmatism without increasing the spherical aberration. As a result, the rear-attachment lens system of the present invention is capable of changing its focal length while ensuring good performance in use with a variety of master lenses ranging from bright normal lenses to dark telephoto lenses.

The rear-attachment lens system of the present invention is composed of a negative first lens element 16 having its concave surface directed toward the image plane 12, a positive second lens element 18 having a convex surface on both sides, a negative third lens element 20 having its concave surface directed toward the master lens with which the lens system is to be used, and a positive fourth lens element 22 having its convex surface directed toward the master lens. The first and second lens element 16 and 18 are cemented together. One of the surfaces $r_6$ and $r_7$ of the fourth lens element 22 which is directed toward the image plane 12 or the master lens is an aspherical surface that has rotational symmetry with respect to the optical axis.

The rear-attachment lens of the present invention will have better performance if it satisfies the following conditions:

(1) $1.3 < \beta < 1.7$
(2) $n_1 - n_2 > 0.20$
(3) $-0.15f < r_2 < -0.25f$
(4) $0.7 < m_{12} < 0.95$ where $\beta$: the magnifying power of the lens system;
$n_1$: the refractive index of the first lens element 16;
$n_2$: the refractive index of the second lens element 18;
$r_2$: the radius of curvature of the second surface (at which the first and second lens elements 16 and 18 are cemented to each other);
f: the focal length of the lens system; and
$m_{12}$: the composite magnifying power of the first and second lens elements 16 and 18.

In a preferred embodiment, the apsherical surface $r_6$ or $r_7$ or the fourth lens element 22 is smoothly curved and its shape function $X(h)$ is expressed as:

$$X(h) = \frac{h^2/r_0}{1 + \sqrt{1 - (1-K) \cdot h^2/r_0^2}} + \sum_{i=2}^{5} A_{2i} h^{2i} \quad (5)$$

The shape function $X(h)$ preferably satisfies the following condition (6) of a non-zero first derivative so that the aspherical surface $r_6$ or $r_7$ is smooth enough to be free of any higher-order waviness.

$$\frac{d(X(h) + r_0 \sqrt{1 - h^2/r_0^2})}{dh} \neq 0 \quad (6)$$

It is particularly advantageous that the amount of asphericity is within the range specified by the following relation (7):

$$|0.001 \cdot f \cdot \beta^4| < \left| X(h_{max}) - r_0 \cdot \left(1 - \sqrt{1 - h_{max}^2/r_0^2}\right) \right| < |0.004 \cdot f \cdot \beta^4|$$

for $0 < h < h_{max}$, i.e., $h_{max}$ is the maximum value of h.
In condition $$X(h_{max}) - r_0 \left(1 - \sqrt{1 - h_{max}^2/r_0^2}\right) > 0$$

when the aspherical surface is on the master lens side and $$X(h_{max}) - r_0 \left(1 - \sqrt{1 - h_{max}^2/r_0^2}\right) < 0$$

when the aspherical surface is on the image plane side.
In these equations,
$X(h)$: the length of a line perpendicular to a plane tangential to the aspherical surface on the optical axis from a point on the aspherical surface that is distant from the optical axis by a radius h;
h: height from the optical axis;
$r_0$: the paraxial radius of curvature of the aspherical surface;
K: cone constant;
$A_n$: n-th order asphericity factor; and
$h_{max}$: maximum effective radius of the aspherical surface which permits the actual passage of light rays.

The rear-attachment lens system of the present invention has a comparatively low magnifying power and because of several reasons such as the constraints on back focus, the system is of the three-unit-four-element configuration.

The first and second lens elements 16 and 18 are cemented to each other so as to achieve compensation for the Petzval sum and spherical aberration that will occur in the rear-attachment lens system of the present invention which overall is a strong negative lens.

If the first and second lens elements 16 and 18 are not cemented and a sufficient power to achieve effective aberrational compensation is imparted to the individual lens surfaces, light rays will encounter the marginal portion of the surface $r_2$ of the first lens element 16 on the image side at an angle large enough to cause total reflection or lens eccentricity will occur to cause deterioration of the system performance. If the first and second lens elements 16 and 18 are cemented, however, the radius of the resulting cemented surface $r_2$ can be reduced without causing total reflection and an optical curvature can be selected for $r_2$.

The third lens element 20 is responsible for the magnifying power of the rear-attachment lens system, while the fourth lens element 22 is responsible for compensation for off-axis aberrations such as distortion, field curvature and astigmatism. The surface $r_6$ or $r_7$ of the fourth lens element 22 which faces the image plane 12 or the master lens side is formed to be aspherical in order to provide improved off-axis performance.

If the upper limit of condition (1) is exceeded, the power of the negative lens elements 16 and 20 must be increased but then color correction by the positive lens elements 18 and 22 becomes inadequate. If the lower limit of condition (1) is not reached, the rear-attachment lens system does not have a sufficient back focus to be usable with a single-lens reflex camera.

Condition (2) sets forth the requirements that should be met in order to ensure sufficient compensation for field curvature by the cemented lenses 16 and 18. By combining the first and second lens elements 16 and 18 having a large difference in refractive index, a substantially powerless cemented lens can be produced and the undercompensation of field curvature that can be attained is sufficient to overcome the overcompensation for field curvature that develops in the third lens element 20.

Condition (3) also sets forth the requirements that should be met for the purpose of achieving appropriate compensation for field curvature. In order to achieve undercompensation for the meridional image plane when astigmatism compensation is effected by the aspherical surface $r_6$ or $r_7$, the second plane $r_2$ at which the first and second lens elements 16 and 18 are cemented must be a divergent surface which satisfies condition (3).

Condition (4) sets forth the requirements that should be met by the magnifying power of the combination of the first and second lens elements 16 and 18. If the lower limit of condition (4) is not reached, the following problems will occur. If the overall magnifying power of the rear-attachment lens system is close to the upper limit of condition (1), the magnifying power of the third lens element 20 must be increased, but then higher-order aberrations will develop and cause inconvenience when the rear-attachment system is attached to a bright master lens.

If the overall magnification is smaller than the middle point of the range specified by condition (1), it becomes difficult to ensure the necessary back focus for the rear-attachment lens system. If, on the other hand, the upper limit of condition (4) is exceeded, only a limited range of optical materials can be employed for making the first and second lens elements 16 and 18 and sufficient achromatism cannot be achieved.

Condition (6) sets forth the requirements that should be met by the change in the amount of asphericity versus the distance, h, from the optical axis. If this condition is not met and the amount of asphericity does not increase monotonically with increaseing h, a large coma aberration will occur to cause disadvantages, such as low resolution at a specific image height. These disadvantages are inherent in lenses containing aspherical surfaces. The conditions under which light rays encounter the rear-attachment lens system vary greatly depending upon the F number and the position of the exit pupil of the master lens. Therefore, the monotonic change in the amount of asphericity is particularly important for the aspherical lens that is employed in the rear-attachment lens system.

Condition (7) sets forth the requirements that should be met by the amount of asphericity of the marginal portion of the fourth lens element 22. If the lower limit of condition (4) is not reached, the fourth lens is in practical terms incapable of reducing the astigmatism or compensates the astigmatism in the wrong direction. If the upper limit of condition (4) is exceeded, the astigmatism is overcompensated to produce inverted astigmatism.

EXAMPLES

Four examples of the rear-attachment lens system of the present invention are shown in the Examples listed below in tabular form. In these tables r signifies the radius of curvature of an individual lens surface, d signifies a lens thickness or an aerial lens distance, $n_d$ denotes the refractive index of an individual lens at the d-line, and $\nu_d$ is Abbe number of an individual lens at the d-line.

EXAMPLE 1

| Surface No. | r | d | $n_d$ | $\nu_d$ |
|---|---|---|---|---|
| 1 | 80.360 | 1.20 | 1.88300 | 40.8 |
| 2 | 17.179 | 7.95 | 1.59270 | 35.3 |
| 3 | −40.022 | 2.38 | | |
| 4 | −33.043 | 1.20 | 1.83481 | 42.7 |
| 5 | −5576.824 | 0.10 | | |
| 6 | 97.463 | 2.82 | 1.48749 | 70.1 |
| 7 | −1375.429 | | | | aspherical surface: seventh surface
$K = 0.0$
$A_4 = -0.154 \times 10^{-4}$
$A_6 = -0.108 \times 10^{-7}$
$A_8 = -0.612 \times 10^{-12}$
$A_{10} = -0.242 \times 10^{-12}$ $d_o$ (a distance from an image point of the master lens to the first surface of the attachment lens) $= -35.8$ Effective F-number of the master lens $F_{NO} = 1:1.7$
$f = -96.736$
$\beta = 1.414$
$n_1 - n_2 = 0.29030$
$r_2 = -0.178f$
$m_{12} = 0.793$

EXAMPLE 2

| Surface No. | r | d | $n_d$ | $\nu_d$ |
|---|---|---|---|---|
| 1 | 111.726 | 1.20 | 1.77250 | 49.7 |
| 2 | 16.381 | 9.15 | 1.56732 | 42.8 |
| 3 | −30.328 | 1.90 | | |
| 4 | −26.298 | 1.20 | 1.77250 | 49.7 |
| 5 | 356.971 | 0.10 | | |
| 6 | 113.650 | 3.30 | 1.48749 | 70.1 |
| 7 | −147.303 | | | | aspherical surface: seventh surface
$K = 0.0$
$A_4 = -0.165 \times 10^{-4}$
$A_6 = -0.836 \times 10^{-8}$
$A_8 = 0.674 \times 10^{-11}$
$A_{10} = -0.370 \times 10^{-12}$ $d_o$ (a distance from an image point of the master lens to the first surface of the attachment lens) $= -35.8$ Effective F-number of the master lens $F_{NO} = 1:1.7$
$f = -98.635$
$\beta = 1.414$
$n_1 - n_2 = 0.20518$
$r_2 = -0.166f$
$m_{12} = 0.727$

EXAMPLE 3

| Surface No. | r | d | $n_d$ | $\nu_d$ |
|---|---|---|---|---|
| 1 | 66.052 | 1.40 | 1.88300 | 40.8 |
| 2 | 15.547 | 8.23 | 1.59270 | 35.3 |
| 3 | −42.027 | 3.16 | | |
| 4 | −35.767 | 2.20 | 1.77250 | 49.7 |
| 5 | 40.292 | 0.20 | | |
| 6 | 39.491 | 6.57 | 1.46450 | 65.9 |
| 7 | −61.331 | | | | aspherical surface: seventh surface
$K = 0.0$
$A_4 = -0.207 \times 10^{-4}$
$A_6 = -0.295 \times 10^{-7}$
$A_8 = 0.445 \times 10^{-10}$ $A_{10} = -0.633 \times 10^{-12}$ $d_o$ (a distance from an image point of the master lens to the first surface of the attachment lens) = $-35.8$ Effective F-number of the master lens $F_{NO} = 1:1.7$ $f = -76.687$
$\beta = 1.600$
$n_1 - n_2 = 0.29030$
$r_2 = -0.203f$
$m_{12} = 0.794$

EXAMPLE 4

Figure 2:
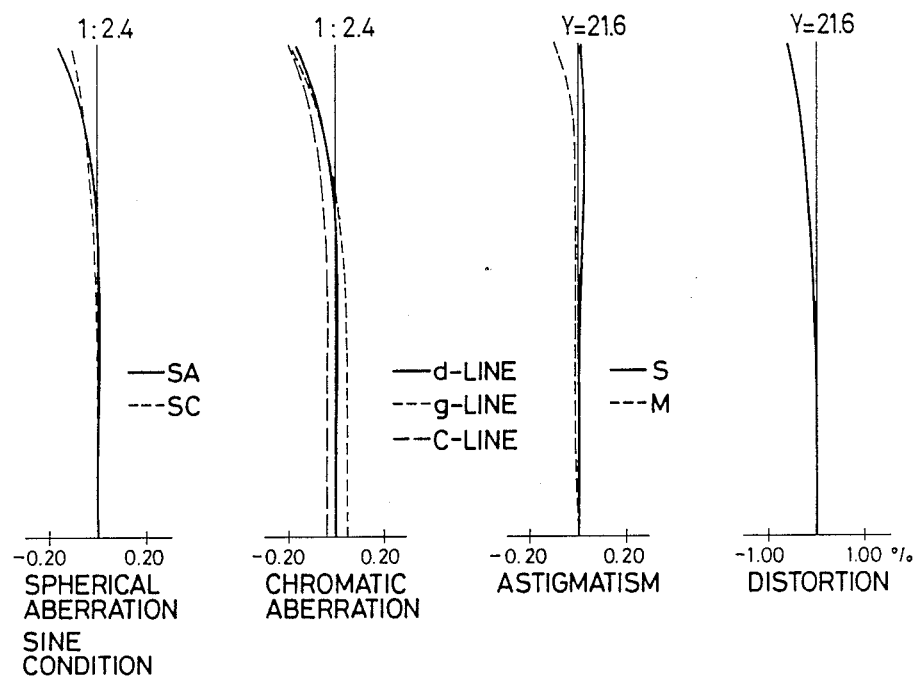
FIG. 2 is a graph plotting the aberration curves obtained when the lens system of FIG. 1 is used as a rear-attachment lens.

| Surface No. | r | d | $n_d$ | $v_d$ |
| --- | --- | --- | --- | --- |
| 1 | 66.731 | 1.20 | 1.88300 | 40.8 |
| 2 | 17.547 | 7.77 | 1.59270 | 35.3 |
| 3 | −38.741 | 1.83 | | |
| 4 | −29.919 | 1.20 | 1.83481 | 42.7 |
| 5 | −273.380 | 0.10 | | |
| 6 | −509.078 | 2.09 | 1.48749 | 70.1 |
| 7 | −193.828 | | | | aspherical surface: sixth surface $K = 0.0$
$A_4 = 0.171 \times 10^{-4}$
$A_6 = 0.734 \times 10^{-8}$
$A_8 = 0.351 \times 10^{-11}$
$A_{10} = 0.829 \times 10^{-13}$ $d_o$ (a distance from an image point of the master lens to the first surface of the attachment lens) = $-35.8$ Effective F-number of the master lens $F_{NO} = 1:1.7$ $f = -94.295$
$\beta = 1.414$
$n_1 - n_2 = 0.29030$
$r_2 = -0.186f$
$m_{12} = 0.733$ FIG. 1 is a simplified cross-sectional view of the rear-attachment lens system fabricated in Example 1 of the present invention. FIG. 2 is a graph plotting the aberrational (spherical, chromatic, astigmatism and distortion) data obtained when the rear-attachment lens of FIG. 1 is used with a non-aberrated master lens of effective F number of $F_{NO} = 1:1.7$ that has an exit pupil 100 mm distant from the image plane.

The aberrational data is presented on four graphs. The first graph plots spherical aberration (SA) and sine condition (SC) as a function of aperture. The second graph plots chromatic aberration for the d-line, g-line and C-line as a function of aperture. The third graph plots astigmatism as a function of image height. The fourth graph plots distortion as a function of image height.

Figure 3:
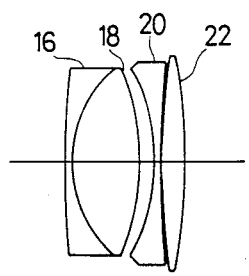
FIG. 3 is a simplified cross-sectional view of the lens system according to Example 2 of the present invention.
Figure 5:
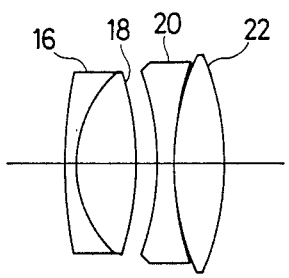
FIG. 5 is a simplified cross-sectional view of the lens system according to Example 3 of the present invention.
Figure 7:
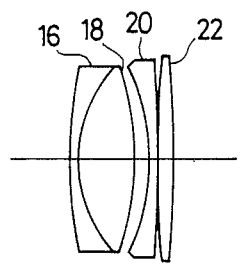
FIG. 7 is a simplified cross-sectional view of the lens system according to Example 4 of the present invention.
Figure 4:
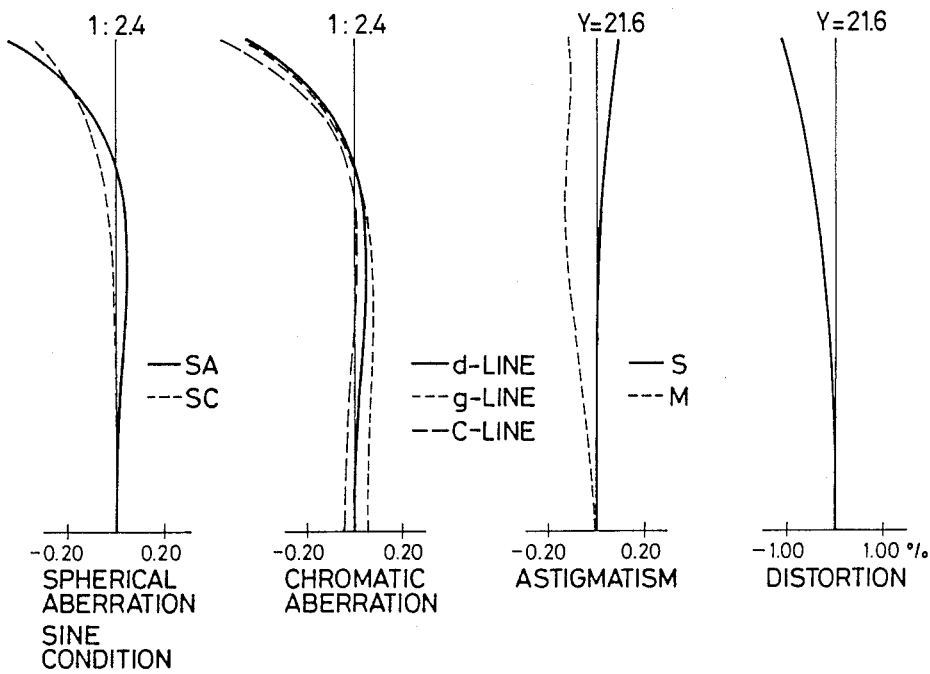
FIG. 4 is a graph plotting the aberration curves obtained when the lens system of FIG. 3 is used as a rear-attachment lens.
Figure 6:
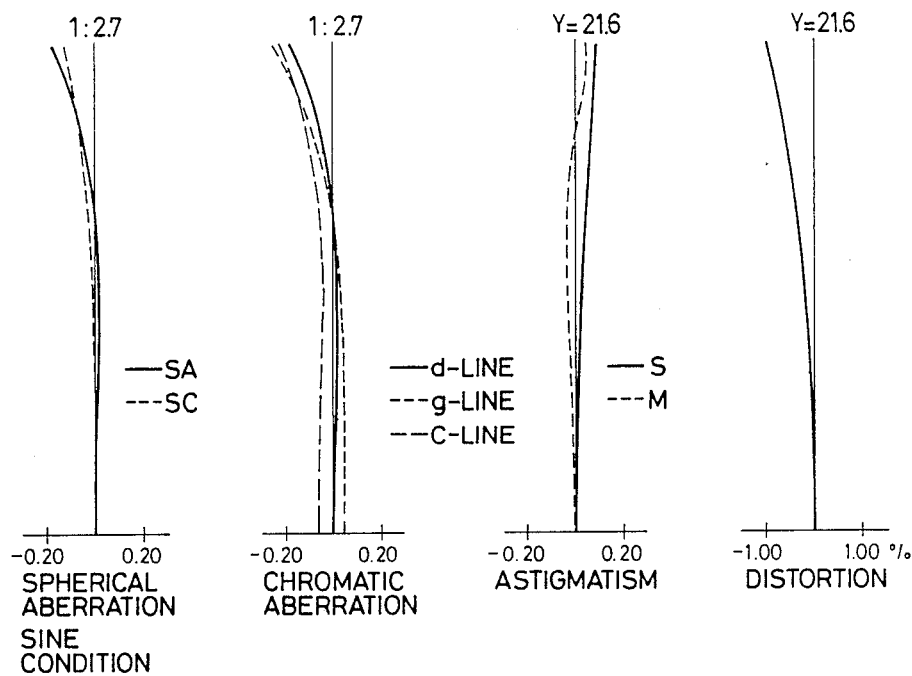
FIG. 6 is a graph plotting the aberration curves obtained when the lens system of FIG. 5 is used as a rear-attachment lens.
Figure 8:
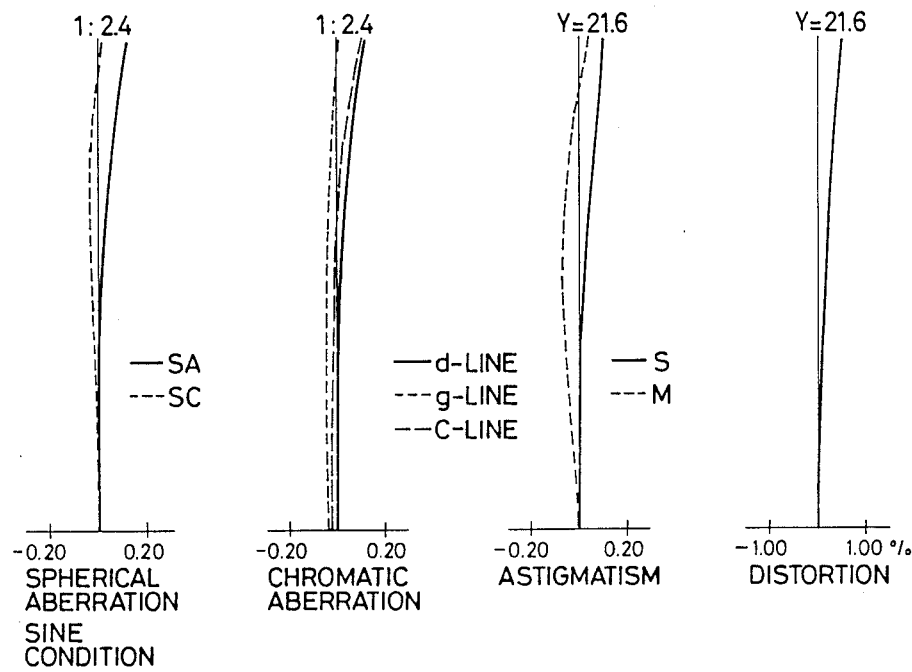
FIG. 8 is a graph plotting the aberration curves obtained when the lens system of FIG. 7 is used as a rear-attachment lens.

FIGS. 3, 5 and 7 are simplified cross-sectional views of the rear-attachment lens systems fabricated in Examples 2 to 4, respectively, of the present invention, and the corresponding aberrational curves are plotted in FIGS. 4, 6 and 8, respectively.

As is clear from the aberrational curves shown in FIGS. 2, 4, 6 and 8, the rear-attachment lens system of present invention which employs as aspherical fourth lens element in a three-unit-four-element configuration has an excellent performance and can be attached to a large variety of master lenses without causing any noticeable deterioration in their optical performance as a result of its being attached. Much better performance can be provided by the rear-attachment lens system of the present invention if it satisfies the conditions (1) to (4). Furthermore, if the shape of the aspherical surface is a smooth curve that satisfied condition (5), deterioration due to field curvature and astigmatisms will not occur at an intermediate viewing angle and good image quality is ensured for a wide coverage ranging from the central optical axis to every corner of the image plane.

I claim:

1. A rear-attachment lens system which is mounted between a master lens and an image plane of a camera for the purpose of providing an increased composite focal length, said lens system comprising:
   a negative first lens element having a concave surface directed toward the image plane;
   a positive second lens element having a convex surface on both sides, said first and second lens elements being cemented together;
   a negative third lens element having a concave surface directed toward the master lens; and
   a positive fourth lens element having its convex surface directed toward the master lens, a surface of the fourth lens element which is directed toward one of said image plane and master lens being an aspherical surface that has rotation symmetry with respect to an optical axis of said lens system.

2. A rear-attachment lens system according to claim 1 wherein the aspherical surface of the fourth lens element is smoothly curved and its shape function X(h) is expressed as the condition:

$$X(h) = \frac{h^2/r_0}{1 + \sqrt{1 - (1-K) \cdot h^2/r_0^2}} + \sum_{i=2}^{5} A_{2i} h^{2i}$$

where

X(h): a length of a line perpendicular to and extending from a plane tangential to said aspherical surface on said optical axis to a point on said aspherical surface that is distant from said optical axis by a radius h;

$r_0$: a paraxial radius of said aspherical surface;

K: cone constant; and $A_n$: n-th order asphericity factor.

3. A rear-attachment lens system according to claim 1 which satisfies the following conditions:

(1) $1.3 < \beta < 1.7$
(2) $n_1 - n_2 > 0.20$
(3) $-0.15f < r_2 < -0.25f$
(4) $0.7 < m_{12} < 0.95$ where $\beta$: a magnifying power of said lens system;

$n_1$: a refractive index of the first lens element;

$n_2$: a refractive index of the second lens element;

$r_2$: a radius of curvature of a surface at which the first and second lens elements are cemented to each other;

f: the focal length of said lens system; and $m_{12}$: a composite magnifying power of the first and second lens elements.

4. A rear-attachment lens system according to claim 3, further satisfying the following condition:

$$|0.001 \cdot f \cdot \beta^4| < \left| X(h_{max}) - r_0 \cdot \left( 1 - \sqrt{1 - h_{max}^2/r_0^2} \right) \right| < |0.004 \cdot f \cdot \beta^4|$$

where

X(h): a length of a line perpendicular to and extending from a plane tangential to said aspherical surface on said optical axis to a point on said aspherical surface that is distant from said optical axis by a radius h;

$r_0$: a paraxial radius of said aspherical surface; and $h_{max}$: a maximum effective radius of said aspherical surface which permits the actual passage of light rays.

5. A rear-attachment lens system according to claim 3 wherein the aspherical surface of the fourth lens element is smoothly curved and its shape function X(h) is expressed as the condition:

$$X(h) = \frac{h^2/r_0}{1 + \sqrt{1 - (1 - K) \cdot h^2/r_0^2}} + \sum_{i=2}^{5} A_{2i} h^{2i}.$$

where

K: cone constant;

$A_n$: n-th order asphericity factor.

6. A rear-attachment lens system according to claim 5, further satisfying the following condition:

$$|0.001 \cdot f \cdot \beta^4| < \left| X(h_{max}) - r_0 \cdot \left(1 - \sqrt{1 - h_{max}^2/r_0^2}\right) \right| < |0.004 \cdot f \cdot \beta^4|$$

7. A rear-attachment lens system as recited in claim 5, wherein said first lens element has a radius of curvature $r_1$ of a surface directed away from said image plane, a central thickness of $d_1$ and an Abbe number of $v_1$, said second lens element has a radius of curvature $r_3$ of a surface directed towards said image plane, a central thickness of $d_2$ and an Abbe number of $v_2$, said third lens element is separated from said second lens element by a distance of $d_3$ and has radii of curvature $r_4$ and $r_5$ of surfaces directed respectively away from and toward said image plane, a central thickness of $d_4$, a refractive index of $n_4$ and an Abbe number of $v_4$, and said fourth lens element is separated from said third lens element by a distance of $d_5$ and has a radius of curvature $r_6$ of a surface directed away from said image plane, has said paraxial radius of curvature $r_0 = r_7$ of said aspherical surface directed toward said image plane, and has a central thickness of $d_6$, a refractive index of $n_6$ and an Abbe number of $v_6$ and wherein said lens elements substantially satisfy the following table;

| i | $r_i$ | $d_i$ | $n_i$ | $v_i$ |
|---|---|---|---|---|
| 1 | 80.360 | 1.20 | 1.88300 | 40.8 |
| 2 | 17.179 | 7.95 | 1.59270 | 35.3 |
| 3 | −40.022 | 2.38 | | |
| 4 | −33.043 | 1.20 | 1.83481 | 42.7 |
| 5 | −5576.824 | 0.10 | | |
| 6 | 97.463 | 2.82 | 1.48749 | 70.1 |
| 7 | −1375.429 | | | |

8. A rear-attachment lens system as recited in claim 5, wherein said first lens element has a radius of curvature $r_1$ of a surface directed away from said image plane, a central thickness of $d_1$ and an Abbe number of $v_1$, said second lens element has a radius of curvature $r_3$ of a surface directed towards said image plane, a central thickness of $d_2$ and an Abbe number of $v_2$, said third lens element is separated from said second lens element by a distance of $d_3$ and has radii of curvature $r_4$ and $r_5$ of surfaces directed respectively away from and toward said image plane, a central thickness of $d_4$, a refractive index of $n_4$ and an Abbe number of $v_4$, and said fourth lens element is separated from said third lens element by a distance of $d_5$ and has a radius of curvature $r_6$ of a surface directed away from said image plane, has said paraxial radius of curvature $r_0 = r_7$ of said aspherical surface directed toward said image plane, and has a central thickness of $d_6$, a refractive index of $n_6$ and an Abbe number of $v_6$ and wherein said lens elements substantially satisfy the following table;

| i | $r_i$ | $d_i$ | $n_i$ | $v_i$ |
|---|---|---|---|---|
| 1 | 111.726 | 1.20 | 1.77250 | 49.7 |
| 2 | 16.381 | 9.15 | 1.56732 | 42.8 |
| 3 | −30.328 | 1.90 | | |
| 4 | −26.298 | 1.20 | 1.77250 | 49.7 |
| 5 | 356.971 | 0.10 | | |
| 6 | 113.650 | 3.30 | 1.48749 | 70.1 |
| 7 | −147.303 | | | |

9. A rear-attachment lens system as recited in claim 5, wherein said first lens element has a radius of curvature $r_1$ of a surface directed away from said image plane, a central thickness of $d_1$ and an Abbe number of $v_1$, said second lens element has a radius of curvature $r_3$ of a surface directed towards said image plane, a central thickness of $d_2$ and an Abbe number of $v_2$, said third lens element is separated from said second lens element by a distance of $d_3$ and has radii of curvature $r_4$ and $r_5$ of surfaces directed respectively away from and toward said image plane, a central thickness of $d_4$, a refractive index of $n_4$ and an Abbe number of $v_4$, and said fourth lens element is separated from said third lens element by a distance of $d_5$ and has a radius of curvature $r_6$ of a surface directed away from said image plane, has said paraxial radius of curvature $r_0 = r_7$ of said aspherical surface directed toward said image plane, and has a central thickness of $d_6$, a refractive index of $n_6$ and an Abbe number of $v_6$ and wherein said lens elements substantially satisfy the following table;

| i | $r_i$ | $d_i$ | $n_i$ | $v_i$ |
|---|---|---|---|---|
| 1 | 66.052 | 1.40 | 1.88300 | 40.8 |
| 2 | 15.547 | 8.23 | 1.59270 | 35.3 |
| 3 | −42.027 | 3.16 | | |
| 4 | −35.767 | 2.20 | 1.77250 | 49.7 |
| 5 | 40.292 | 0.20 | | |
| 6 | 39.491 | 6.57 | 1.46450 | 65.9 |
| 7 | −61.331 | | | |

10. A rear-attachment lens system as recited in claim 5, wherein said first lens element has a radius of curvature $r_1$ of a surface directed away from said image plane, a central thickness of $d_1$ and an Abbe number of $v_1$, said second lens element has a radius of curvature $r_3$ of a surface directed towards said image plane, a central thickness of $d_2$ and an Abbe number of $v_2$, said third lens element is separated from said second lens element by a distance of $d_3$ and has a radii of curvature $r_4$ and $r_5$ of surfaces directed respectively away from and toward said image plane, a central thickness of $d_4$, a refractive index of $n_4$ and an Abbe number of $v_4$, and said fourth lens element is separated from said third lens element by a distance of $d_5$ and has said paraxial radius of curvature $r_0 = r_6$ of said aspherical surface directed away from said image plane, has a radius of curvature $r_7$ of a surface directed toward said image plane, and has a central thickness of $d_6$, a refractive index of $n_6$ and an Abbe number of $v_6$ and wherein said lens elements substantially satisfy the following table;

| i | $r_i$ | $d_i$ | $n_i$ | $v_i$ |
|---|---|---|---|---|
| 1 | 66.731 | 1.20 | 1.88300 | 40.8 |
| 2 | 17.547 | 7.77 | 1.59270 | 35.3 |
| 3 | −38.741 | 1.83 | | |
| 4 | −29.919 | 1.20 | 1.83481 | 42.7 |
| 5 | −273.380 | 0.10 | | |
| 6 | −509.078 | 2.09 | 1.48749 | 70.1 |
| 7 | −193.828 | | | |

* * * * *